(12) United States Patent  
Allen et al.

(10) Patent No.: US 7,770,673 B2  
(45) Date of Patent: Aug. 10, 2010

(54) BATTERY POWERED SHUTTLE CAR

(75) Inventors: Claude R. Allen, Daniels, WV (US); Thomas S. Cushman, Beckley, WV (US); Jimmy A. Hickok, Mabscott, WV (US); Purnal L. McWhorter, Daniels, WV (US)

(73) Assignee: Phillips Machine Service, Inc., Beckley, WV (US)

( * ) Notice: Subject to any disclaimer, the term of this patent is extended or adjusted under 35 U.S.C. 154(b) by 266 days.

(21) Appl. No.: 10/380,061

(22) PCT Filed: Sep. 13, 2001

(86) PCT No.: PCT/US01/28369

§ 371 (c)(1),
(2), (4) Date: Apr. 2, 2003

(87) PCT Pub. No.: WO02/22388

PCT Pub. Date: Mar. 21, 2002

(65) Prior Publication Data

US 2003/0205421 A1    Nov. 6, 2003

Related U.S. Application Data

(60) Provisional application No. 60/230,933, filed on Sep. 13, 2000, provisional application No. 60/238,016, filed on Oct. 6, 2000.

(51) Int. Cl.
*B60K 1/04* (2006.01)
*B60R 16/04* (2006.01)
*B60P 1/00* (2006.01)
*G01F 23/00* (2006.01)

(52) U.S. Cl. ............... 180/65.1; 180/68.5; 414/528; 116/227

(58) Field of Classification Search ............... 116/227; 414/528; 180/65.1, 22, 24.01, 68.5
See application file for complete search history.

(56) References Cited

U.S. PATENT DOCUMENTS

| | | | | |
|---|---|---|---|---|
| 2,192,650 A | * | 3/1940 | Russell | 414/528 |
| 2,336,386 A | * | 12/1943 | Beck | 414/528 |
| 2,399,619 A | * | 5/1946 | Beck | 414/528 |
| 2,405,636 A | * | 8/1946 | Beck | 180/62 |

(Continued)

OTHER PUBLICATIONS

Exide-Ironclad Battery Advertisement, Coal Age, Mar. 1954, p. 225.

(Continued)

*Primary Examiner*—Paul N Dickson
*Assistant Examiner*—John R Olszewski
(74) *Attorney, Agent, or Firm*—Nixon & Vanderhye P.C.

(57) ABSTRACT

A battery powered shuttle car (10) incorporates features and components that facilitate use and operation and effect efficient application in a mining environment. The shuttle car (10) incorporates at least one battery (20) that is secured to the vehicle frame (11) between one of a left front wheel (17) and a left rear wheel (17) or the right front wheel (17) and the right rear wheel (17). A battery change-over mechanism (51) facilitates battery replacement. Additionally, the shuttle car (10) may be provided with an integral discharge end (81) having a substantially fixed height (82). A full load indicator mechanism (83) provides an indication when the conveyor (16) is substantially full to maximize use and operation of the shuttle car (10).

3 Claims, 16 Drawing Sheets

U.S. PATENT DOCUMENTS

| | | | |
|---|---|---|---|
| 2,588,341 A | | 3/1952 | Beck |
| 2,599,061 A | * | 6/1952 | Lee .............................. 414/528 |
| 2,634,008 A | * | 4/1953 | Osgood ....................... 414/528 |
| 2,637,457 A | * | 5/1953 | Lee .............................. 414/528 |
| 2,777,526 A | * | 1/1957 | Dudley ........................ 180/2.1 |
| 3,185,324 A | * | 5/1965 | Breithaupt et al. .......... 414/528 |
| 3,370,667 A | | 2/1968 | Bishop |
| 3,545,634 A | * | 12/1970 | Reed ........................... 414/492 |
| 3,799,063 A | * | 3/1974 | Reed ........................... 104/34 |
| 3,827,720 A | * | 8/1974 | Lee .............................. 280/400 |
| 3,827,721 A | * | 8/1974 | Coval .......................... 280/400 |
| 3,865,206 A | * | 2/1975 | Coval .......................... 180/24 |
| 3,874,698 A | * | 4/1975 | Lee et al. ..................... 280/408 |
| 4,174,013 A | | 11/1979 | Yago |
| 4,245,714 A | * | 1/1981 | Kersey ........................ 180/265 |
| 4,291,777 A | * | 9/1981 | Yale ........................... 180/24.06 |
| 4,465,155 A | * | 8/1984 | Collins ........................ 180/169 |
| 4,556,117 A | * | 12/1985 | Frey et al. ................. 180/89.13 |
| 4,570,741 A | | 2/1986 | McCoy |
| 4,576,107 A | * | 3/1986 | Brasher ...................... 116/227 |
| 5,163,537 A | | 11/1992 | Radev |
| 5,285,866 A | | 2/1994 | Ackroyd |
| 5,598,083 A | | 1/1997 | Gaskins |
| 5,734,238 A | * | 3/1998 | Yanagisawa et al. ......... 318/139 |
| 5,810,106 A | | 9/1998 | McCoy |
| 6,494,279 B1 | | 12/2002 | Hutchens |

OTHER PUBLICATIONS

Joy 20AH27 Articulated Hauler Brochure, Date Unknown, 3 pgs.

\* cited by examiner

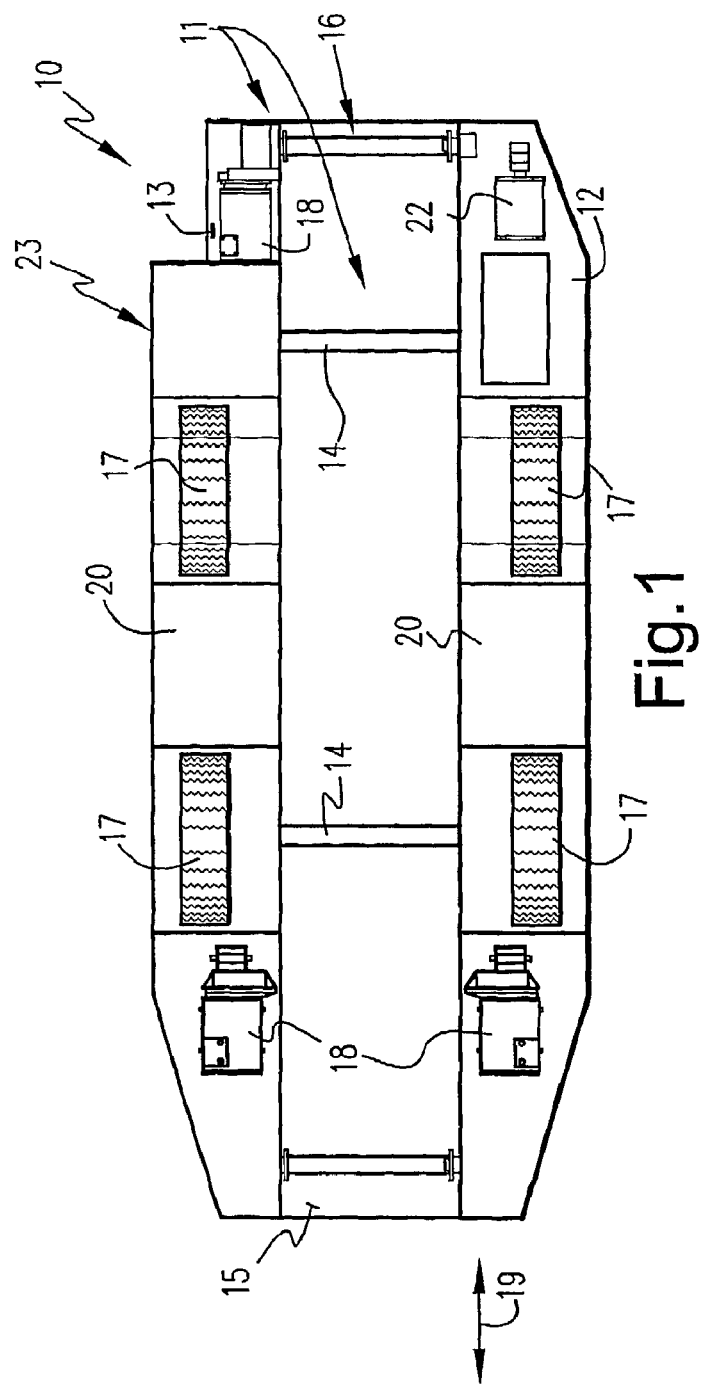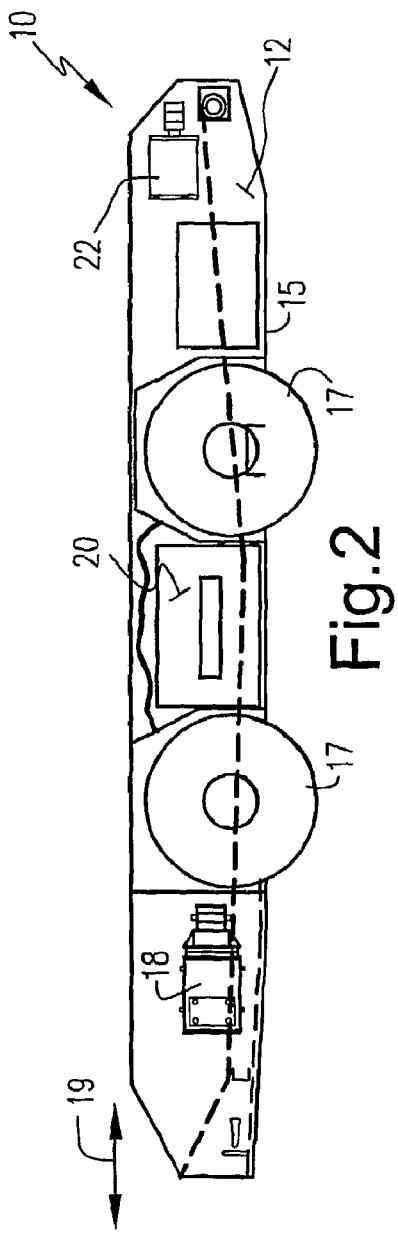

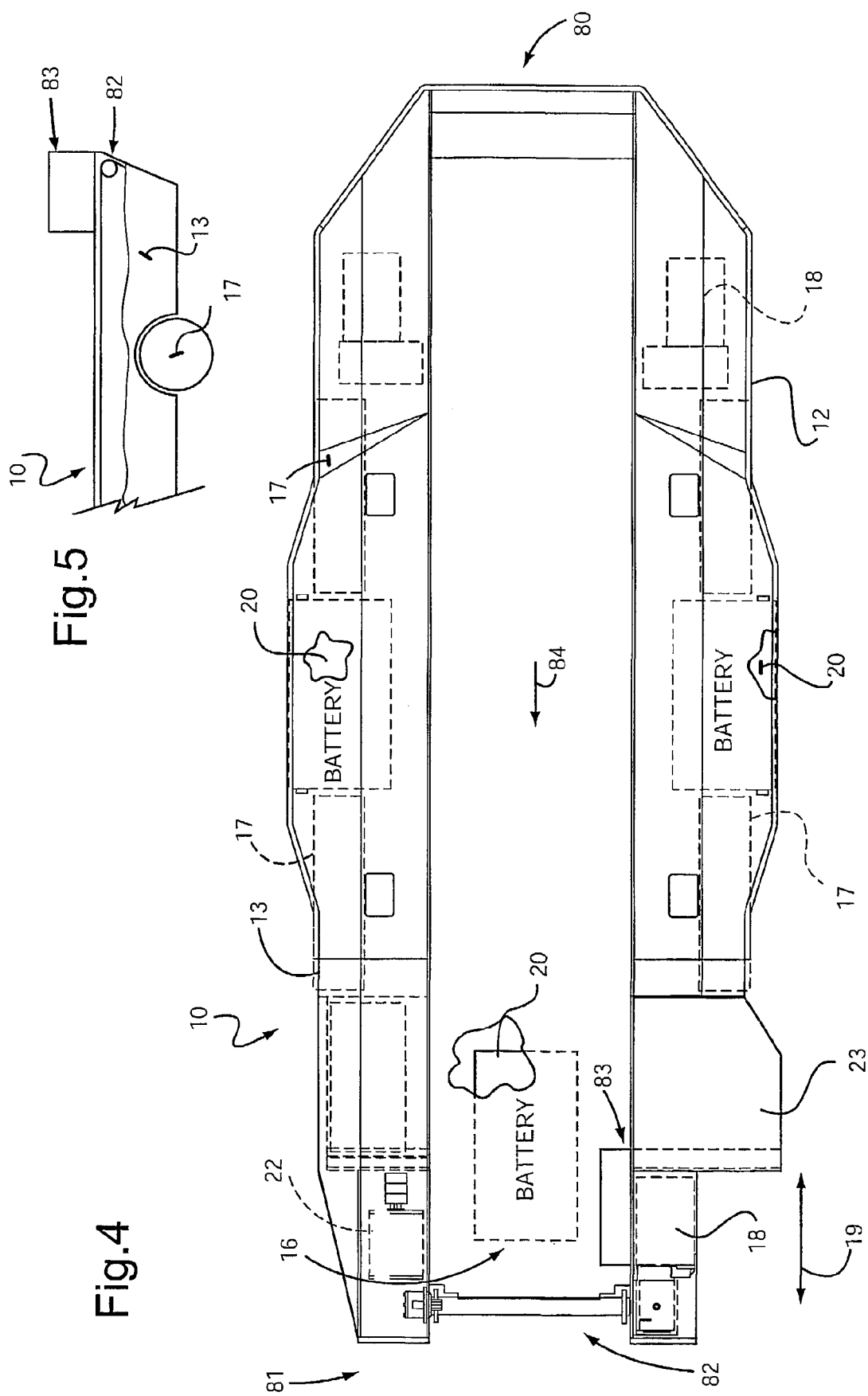

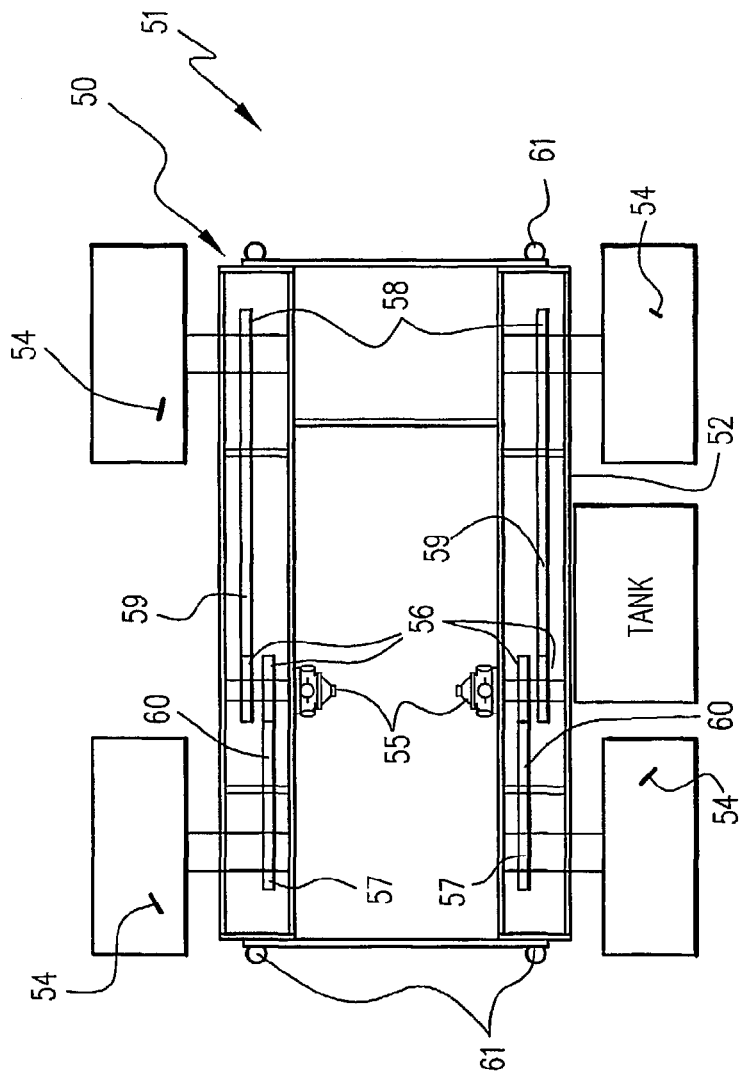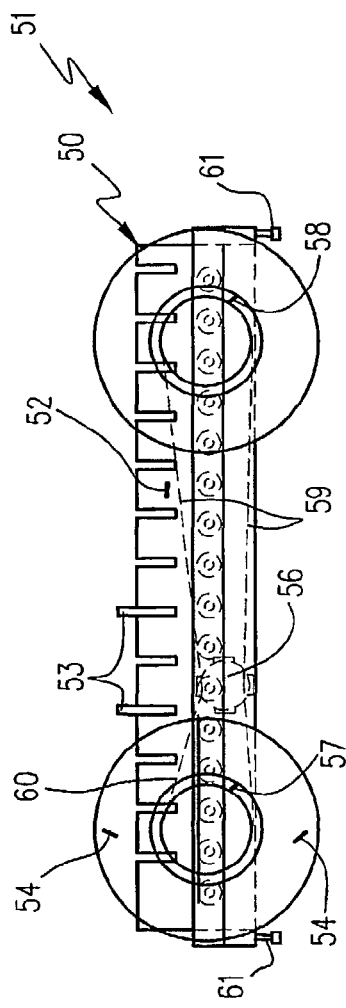

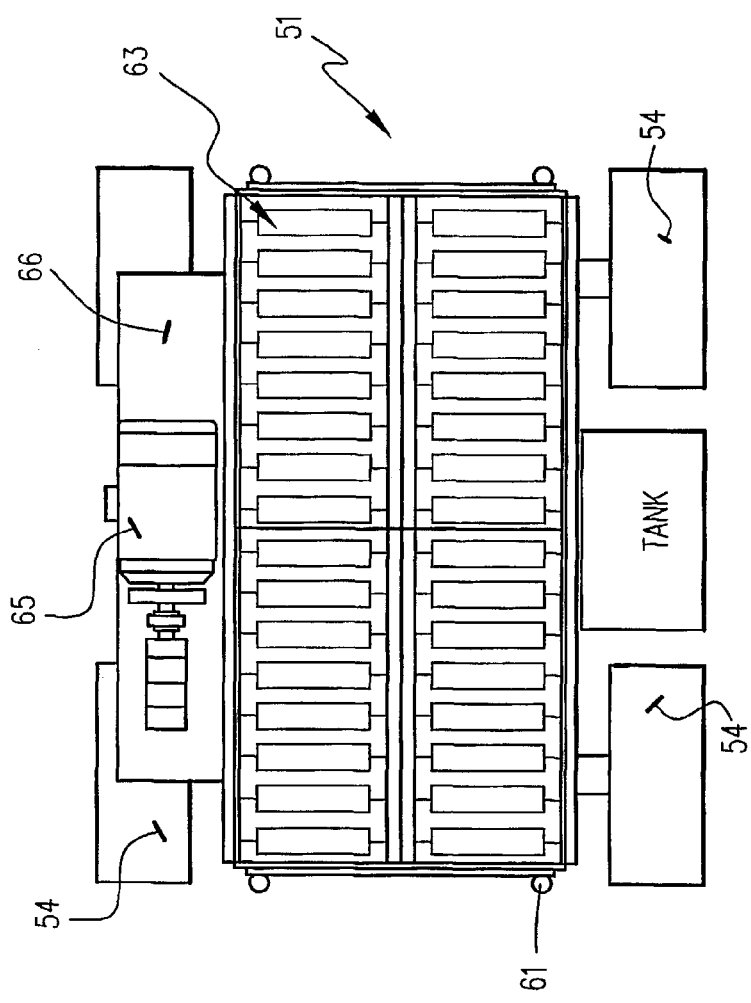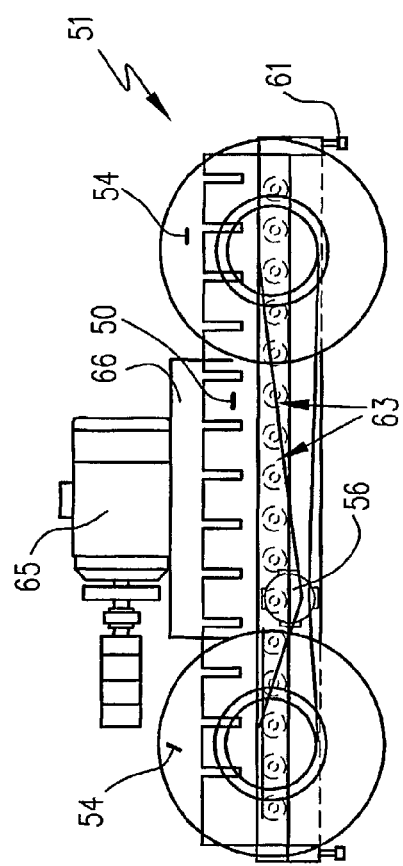
Fig. 17
Fig. 18

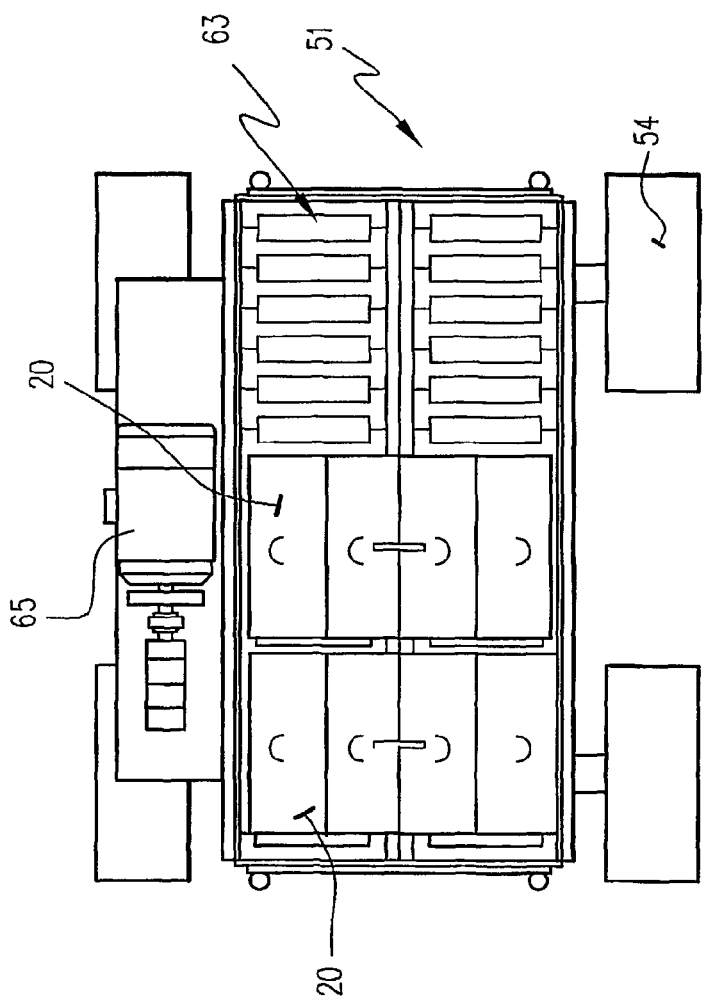
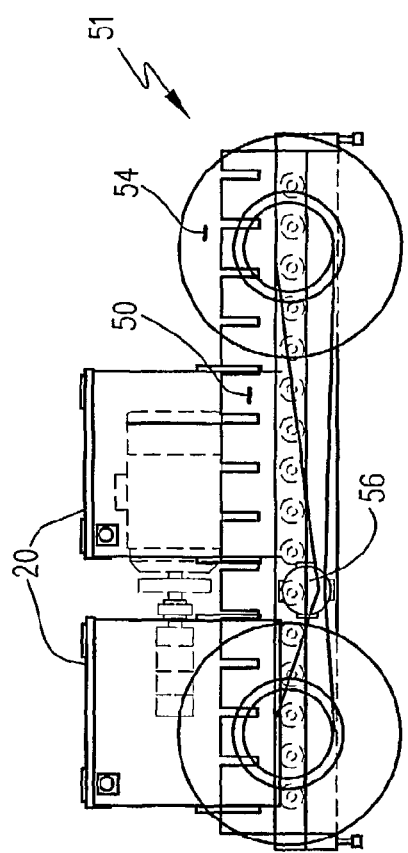

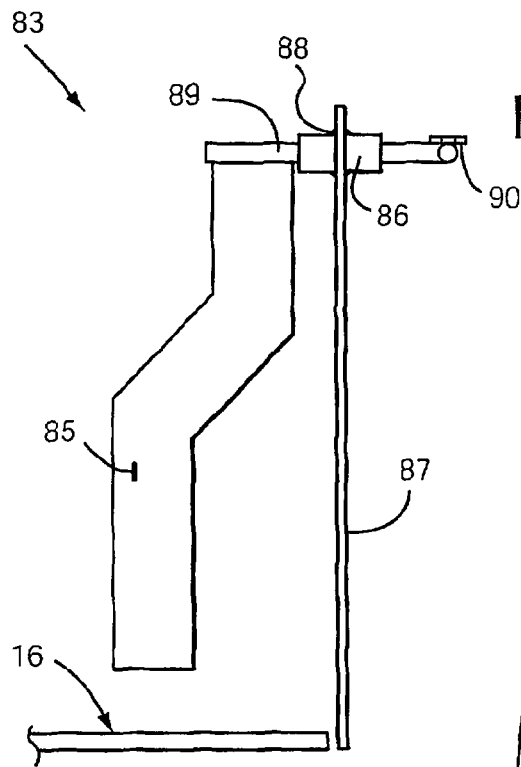
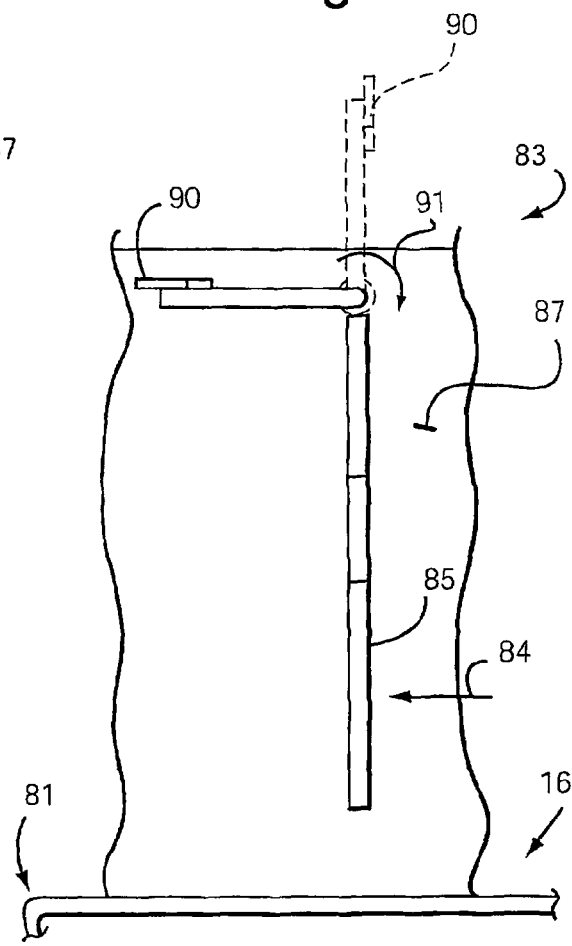
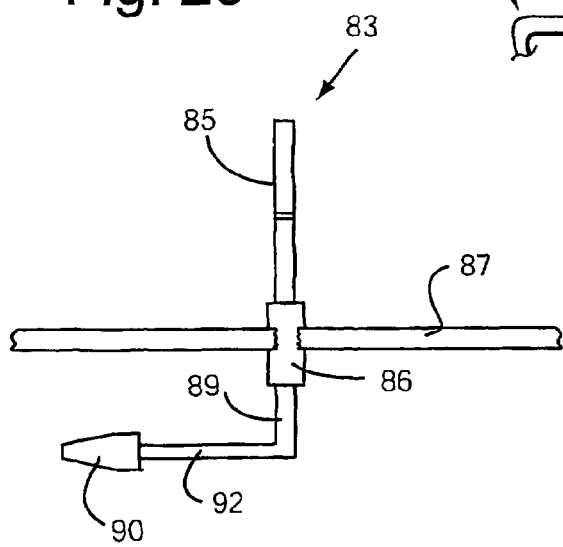

BATTERY POWERED SHUTTLE CAR

This application is the U.S. national phase of International Application No. PCT/US01/28369 filed 13 Sep. 2001 which designated the U.S. and claims priority to U.S. Provisional Patent Application Ser. No. 60/230,933 filed 13 Sep. 2000, and U.S. Provisional Patent Application Ser. No. 60/238,016 filed 6 Oct. 2000 the entire contents of each of which are hereby incorporated by reference.

STATEMENT REGARDING FEDERALLY SPONSORED RESEARCH OR DEVELOPMENT (NOT APPLICABLE)

BACKGROUND OF THE INVENTION

The present invention relates to mining vehicles and, more particularly, to a battery powered mining shuttle car.

One function that always must be performed during mining is to transport mined material from the point of mining to a point of discharge, such as into a feeder device which ultimately transports the mined material to the mine mouth. Starting at least as early as the 1940's (e.g., see U.S. Pat. Nos. 2,192,650; 2,588,341 and 3,370,667), this was accomplished utilizing a battery powered vehicle with a central conveyor. In order to maximize production level and equipment utilization, it was customary to use two or more shuttle cars that were loaded and discharged alternatively. The flexibility of the movement of the shuttle car is important as it requires travel through the labyrinth maze of a mine. In commercial embodiments, shuttle cars were powered by a 300 amp hour storage battery mounted at one end of the shuttle car. It soon became apparent, however, that a battery, the size and capacity of which had been dictated by the constraints of the vehicle configuration, mining dimensions, and other technology of the time, coupled with the realities of weight and balance, was an impractical energy source in production mining environment.

As a result, from the mid-1940' to today, the majority of commercial shuttle cars have been powered by trailing cables through vehicle-mounted cable reels. As a consequence, however, a shuttle car can no longer travel independently in the shortest possible distance between the production face and the dump point. Also, no longer can more than one car travel the same route without interference from other cars, and no longer can the mining supervisor extend the haulage to meet other needs without additional complications, such as the splicing-in of additional cable which cannot be accommodated on the cable reel.

In order to overcome the limitations of cable reel shuttle cars, several manufacturers have developed and market battery powered haulage vehicles of another type to compete for the haulage market. These vehicles are designed with the battery on one end and a haulage compartment on the other end, with the operator's compartment situated in between. The vehicle is articulated in order to be able to maneuver in a mining environment.

While such a design is optimal for the incorporation of large 1500 amp hour or greater batteries, there are a number of operational disadvantages for such a vehicle. The haulage compartment does not have the through-the-vehicle conveyor of the shuttle car, and as a result, the vehicle must be loaded while facing in one direction, and the hauled material must be discharged in the opposite direction, thereby necessitating vehicle reversal at least once in each direction of travel.

In addition to the extra cycle time required for this maneuver, the additional electrical energy required to travel the extra distance involved, plus the additional electrical energy required to stop, start, and steer the shuttle car during reversal, all subtract from the finite amount of energy available on the on-board storage battery.

The articulated configuration of this type of car also makes it difficult to provide all-wheel drive. Two wheel drive produces traction problems in the wet, soft bottoms and gradients that characterize many mining operations. Some exemplary embodiments of the articulated vehicles can be optionally equipped at a considerable extra price with manually-actuated, hydraulic drive for the other wheels, an arrangement that also consumes electrical energy at a very high rate when placed in operation. Often this manual-actuation tales place after the vehicle is immobilized and in a state that would not have occurred if the vehicle had been equipped with full-time, all-wheel drive. The traction problem is further exacerbated by the uneven distribution of weight carried by the tires, especially when the shuttle car is traveling in the unloaded portion of the cycle.

The consistently high loading of the tires on the battery/traction end of the shuttle car also shortens the life of these tires, so much so that some manufacturers have even resorted to solid tires constructed of synthetic, non-rubber materials with attendant reductions in tractive capabilities as an undesirable trade-off.

Additionally, in the use of shuttle cars, it is typical that there is an elevating discharge assembly (which can be raised and lowered) at the discharge (unloading) end, particularly for cable shuttle cars. For many purposes, however, such an elevating structure is not useful, and with the particular battery powered shuttle car of this invention, it can be much more desirable to provide a fixed height discharge at the unloading end.

When operating shuttle cars, it is highly desirable that the operator be able to effectively determine the proper position of the load with respect to the discharge end in order to avoid spillage on the floor. It is difficult to position the operator's compartment safely and effectively (so that the operator can easily operate the shuttle car), while not interfering with the coal or other mined material transport function of the conveyor, and still allow the operator to see when the shuttle car is "full" of material, so that it should be operated to go to a discharge location. To solve this problem, it may be desirable to incorporate a load indicator or the like viewable to the operator.

Also, it is necessary that the batteries that are provided with the shuttle car be able to be safely utilized in a mine environment. In particular, it is desirable to be able to de-energize the battery box either in a non-operating condition of the shuttle car, or in response to a particular condition.

BRIEF SUMMARY OF THE INVENTION

According to the present invention a new type of battery powered shuttle car is provided which avoids the problems of the original battery powered shuttle cars while retaining their advantages, which is significantly superior to the cable reel shuttle cars and conventional battery powered haulage compartment articulated vehicles, which achieves the objectives set forth above in a simple and effective manner. According to the present invention a battery powered shuttle car is provided that has batteries mounted with respect to the vehicle so that there is substantially uniform tire loading, little vulnerability to damage of the batteries by mining equipment, solid state electronic motor control that provides infinitely variable control while conserving battery energy, and simple and effective battery removal and replacement. The shuttle car according to the invention also utilizes tire technology that can handle the combined load of the machine, payload, as well as a lead acid battery of sufficient capacity to make cable-less battery powered functionality viable. That is, the shuttle car according to the invention may readily incorporate batteries having an amp hour capacity of at least 500, e.g. about 500-2500, amp hours.

In an exemplary embodiment of the invention a battery powered shuttle car is provided with a vehicle frame supporting a plurality of wheels including at least a left front wheel, a left rear wheel, a right front wheel, and a right rear wheel. At least one motor is coupled with the vehicle frame and the plurality of wheels, and at least one battery is operatively coupled with the motor. The battery serves to provide power to at least the motor. The battery is preferably secured to the vehicle frame between one of (1) the left front wheel and the left rear wheel, and (2) the right front wheel and the right rear wheel. In one embodiment, the shuttle car includes at least two motors coupled with the vehicle frame and the plurality of wheels, with two batteries, wherein one of the two batteries is secured to the vehicle frame between the left front wheel and the left rear wheel, and the other of the two batteries is secured to the vehicle frame between the right front wheel and the right rear wheel. In yet another arrangement, the shuttle car includes four motors, one each operatively coupled with each of the plurality of wheels.

The one or more batteries preferably have a collective capacity of at least 500 amp hours. Additionally, the shuttle car may include a solid state IGBT and/or SCR-powered electronic direct current motor control operatively connected between the at least one battery and the at least one motor. A conveyor may be provided centrally disposed and coupled with the vehicle frame, wherein the at least one motor drives at least one of the plurality of wheels and the conveyor.

The shuttle car may also include a battery change-over mechanism coupled with the vehicle frame and including a pair of lever arms cooperating with structure extending outwardly from the at least one battery. At least one actuating mechanism such as a linear actuator powers the lever arms. The actuating mechanism and the lever arms move the at least one battery from a position on the vehicle frame to a position on the ground or on a ground supported structure. An alternative battery change-over mechanism includes (1) a first overhead hoist that elevates the at least one battery from the vehicle frame and that includes a battery charger that receives the at least one battery for charging, and (2) a second overhead hoist disposed adjacent the first overhead hoist, the second overhead hoist lowering charged batteries for attachment to the vehicle. In this context, the battery charger may include a charging station disposed remote from the first overhead hoist. An additional battery changeover mechanism includes the use of a separate forklift-style vehicle and/or mechanism suitably affixed in the change-over area. The at least one battery is fitted with forklift fork pockets as an integral part of and projecting from the battery box. The shuttle car frame is fitted with forklift fork pocket locator slots. The pockets and slots can be arranged in any combination of male and female configuration. This combination of devices provides quick and precise positioning of the at least one battery during the change-over process when using any of the several battery change-over mechanisms herein described.

In another embodiment, the shuttle car includes a receiving end and a discharge end, wherein the discharge end is integrated into the frame defining a one-piece frame construction, and wherein the discharge end has a substantially fixed height. A conveyor may be centrally disposed and coupled with the vehicle frame. A full load indicator mechanism is at least partially positioned adjacent the discharge end, wherein the full load indicator mechanism provides an indication when the conveyor is substantially full. In this context, the full load indicator preferably includes a sensing arm disposed in a material path of the conveyor, a pivot rod mounted in a bushing, and an indicator, the sensing arm and the indicator being connected to the pivot rod.

The shuttle car may be provided with three batteries connected in series, one of the batteries being disposed between the left front wheel and the left rear wheel, another of the batteries being disposed between the right front wheel and the right rear wheel, and a last of the batteries being disposed in a central portion of the shuttle car. In another arrangement, the shuttle car is provided with three batteries connected in series, one of the batteries being disposed in substantial alignment with the left front wheel and the left rear wheel, another of the batteries being disposed in substantial alignment with the right front wheel and the right rear wheel, and a last of the batteries being disposed in a central portion of the shuttle car. The at least one battery may include a circuit breaker operatively associated therewith for disconnecting the battery when the circuit breaker is operated. In this context, the circuit breaker is manually operated and is contained within an explosion proof housing. A safety circuit may be coupled with at least one of the motor and the battery that prevents the wheels from turning and engages a parking brake.

In another exemplary embodiment of the invention, a method of changing a battery mounted on a battery powered shuttle car is provided, wherein the battery is mounted in alignment with one of (1) a left front wheel and a left rear wheel, and (2) a right front wheel and a right rear wheel. The method includes the steps of securing at least one actuating mechanism to the battery mounted on the battery powered shuttle car; driving the actuating mechanism to thereby move the battery off of the vehicle frame; and receiving the battery on an adjacent mechanism.

BRIEF DESCRIPTION OF THE DRAWINGS

These and other aspects and advantages of the present invention will be described in detail with reference to the accompanying drawings, in which:

FIG. 1 is a top plan view of one exemplary embodiment of the shuttle car according to the present invention;

FIG. 2 is a side schematic view of the shuttle car of FIG. 1;

FIG. 4 is a top plan view of another exemplary shuttle car according to the invention;

FIG. 5 is a side detail view of the discharge end of the shuttle car of FIG. 4 with portions removed for clarity of illustration and with a "full load" indicator shown schematically;

FIGS. 15 and 16 are top and side schematic views of the basic features of a battery change-out vehicle that may be utilized for battery changing according to the invention;

FIGS. 17 and 18 are views like those of FIGS. 15 and 16 only showing a pump motor and hydraulic fluid tank mounted on the battery change-out vehicle;

FIGS. 19 and 20 are views like those of FIGS. 17 and 18 only showing batteries which have been moved onto the battery change-out vehicle;

FIGS. 23, 24 and 25 are front, side, and top views, respectively, of an exemplary "full load" indicator that may be utilized in the shuttle car of the present invention.

DETAILED DESCRIPTION OF THE INVENTION

The particular location of the batteries with respect to the shuttle car, and the motors for powering the wheels of the shuttle car, and the operator's compartment, as well as the quantity of batteries, will depend upon the maximum height restrictions for the coal seam, geological conditions, or other operating environment and the load carrying capacity of the shuttle car. Some particular advantageous configurations in that regard are illustrated in FIGS. 1, 2, 4 and 8-12 of the drawings.

Figure 13:
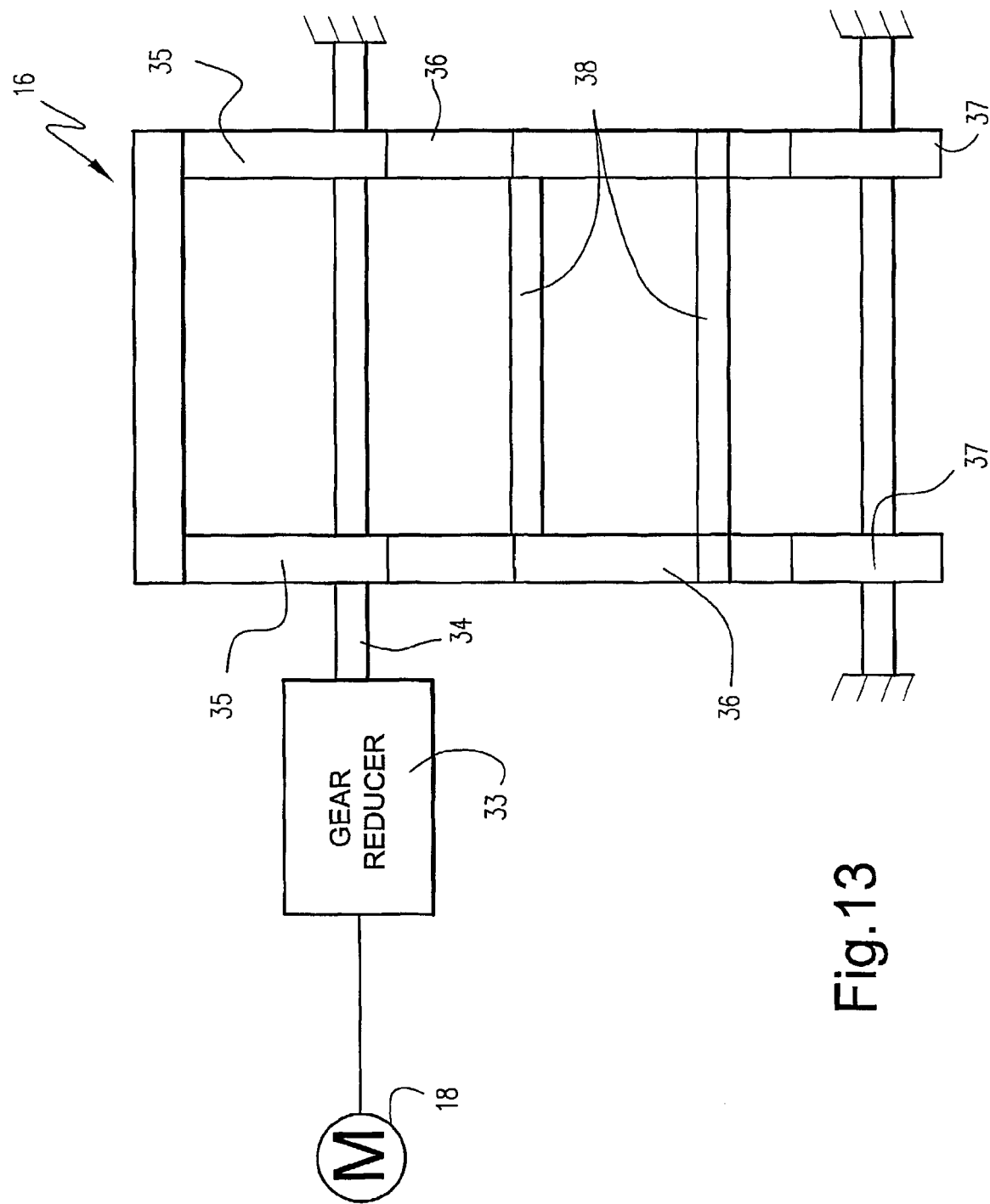
FIG. 13 is a schematic view showing conventional conveyor drive components that may be utilized with any of the embodiments of shuttle cars illustrated in the drawings.

Particularly with respect to the FIGS. 1 and 2 embodiment, a first embodiment of the battery powered shuttle car 10 is illustrated comprising a frame 11 that includes first and second side portions 12, 13, and any suitable cross portions (shown schematically at 14 in FIG. 1, but alternatively provided by a frame portion 15), and a conveyor of conventional configuration—only shown schematically by reference numeral 16 in FIG. 1, but shown, in one embodiment, in more detail in FIG. 13—between the side portions 12, 13 and extending substantially the effective length of the frame 11 for conveying material from one end of the frame 11 to the other.

Figure 3:
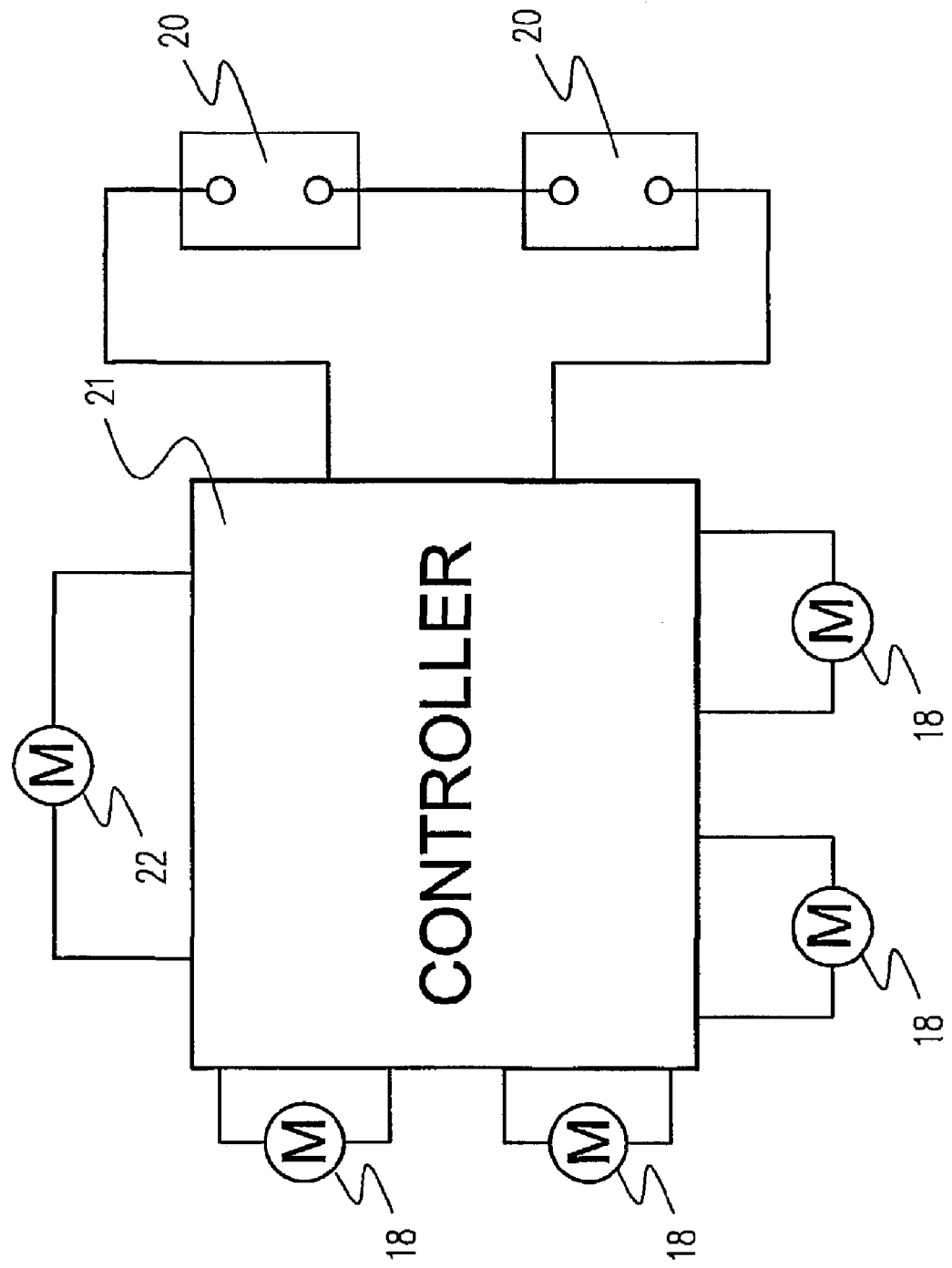
FIG. 3 is a circuit diagram of a suitable motor control that is utilized with the shuttle car of FIGS. 1 and 2.

The shuttle car 10 also has at least four wheels with tires 17, at least two associated with each frame side portion 12, 13, for mounting the frame 11 for movement over a mine floor or the like. The tires 17 may be of conventional configuration such as Goodyear 12:00×20, 24 ply or 14:00×24, 28 ply or equivalent tires by Michelin or other manufacturers. Reversible electric motors, preferably DC motors 18, are provided for powering the wheeled tires 17 (mounted on conventional axles or the like) to effect either forward or reverse movement of the shuttle car 10, as indicated by the double arrows 19 in FIG. 1. As illustrated in FIG. 3, one motor 18 can be provided for driving each wheel/tire 17. Alternatively, two motors 18 may be provided, one for driving the rear tires, and the other the front tires; or one for driving the right side tires, and the other the left side tires. Also, a motor 22 can be provided for driving a hydraulic pump to supply hydraulic fluid to any hydraulic cylinders or other hydraulic motors or other devices on or associated with the shuttle car 10 (e.g. for driving wheels, battery changing, car lock-down, conveyor tilting or adjusting, cab adjustment or leveling, etc.). Also, one or more motors like or unlike the motor 18, can be provided for driving the conventional conveyor.

One or more (preferably at least two) batteries 20 are operatively mounted (i.e., in any suitable manner) on the frame 11 for powering the motors 18 and 22. In the context of the present invention, the term "battery" may refer to a battery, its mounting, or an assembly. Battery assemblies for shuttle cars are typically made up of a number of cells installed in a mounting or casing, which then may be installed in a so-called "tray." In the embodiment illustrated in FIGS. 1 and 2, the batteries 20 are shown mounted in drop-in compartments in the side frame portions 12, 13, each battery 20 being positioned in the dimension 19 between two tires 17 (i.e., a "side saddle" arrangement).

The batteries 20 may also power other electrical equipment (such as headlights of the shuttle car 10).

The particular batteries 20 that are utilized according to the invention may have unusual size cases and connections between the internal plates in order to adapt to the particular shuttle car 10 environment. The actual plates themselves, however, and the interconnections between the plates, are conventional. The battery 20 casings will be designed, depending upon the configuration, to have a minimum width and a maximum length given the constraints of the shuttle car 10 environment, with a maximum ampere hour or kilowatt hour capacity. The capacity and ampere hours will range from 500 amp hours to 2500 amp hours, and the voltage will range from about 64-384 volts, meaning (given present technology) that the number of battery cells ranges from about 32-192. All ranges set forth above also specifically include all narrower ranges within a broad range; that is, the battery capacity of 500-2500 ampere hours also specifically includes 1000-2000 amp hours, 1125-2005 amp hours, and all other narrower ranges within a broad range.

As illustrated in FIG. 3, the shuttle car 10 according to the invention may also comprise a solid state, IGBT (insulated gate bipolar transistor) and/or SCR-powered (silicon controlled rectifier) electronic, direct current motor control, shown generally by reference numeral 21 in FIG. 3, which provides substantially an infinitely variable control of the electric motors 18. The controller 21 is operatively connected between the batteries 20 (which are in series) and the motors 18, as schematically illustrated in FIG. 3. The controller 21 also preferably controls the electric motor 18 (also preferably a reversible DC motor) which powers a conventional conveyor 16. The controller 21 also preferably controls the electric motor 22 which powers the hydraulic pump. The controller 21 is conventional per se, being available from Cable-Form, Long-Airdox, Sevcon and others. One particularly desirable controller 21 is one or more from the A750 series of battery hauler controllers by Saminco. The controller and/or controllers 21 may be mounted anywhere on the shuttle car 10 that is convenient, and conventional electrical cables interconnect the components 18 and 20 through 22.

In the embodiment illustrated in FIGS. 1, 2, and 4 the operator's compartment 23 is positioned adjacent one end of the shuttle car 10, in the side portion 13.

In an alternative arrangement illustrated in FIGS. 4 and 5, three batteries 20 are provided, two mounted side saddle in the side portions 12, 13 between front and rear sets of wheeled tires 17, and the third battery 20 located adjacent one end of the shuttle car 10 in a central location. In the embodiment illustrated in FIG. 4, the central battery 20 is located adjacent a discharge end 81, but it alternatively could be located adjacent a receiving end 80 or anywhere under the conveyor.

In the embodiment illustrated in FIG. 4, the discharge end 81 of the shuttle car 10 preferably has a fixed height configuration, as illustrated schematically at 82 in FIGS. 4 and 5. That is, there is no elevating (raised or lowered) discharge assembly, but rather the fixed height configuration provides for ease of operation, and reduces the cost and complication of the shuttle car, without any significant drawback. Elimination of the elevating discharge boom enables the integration of the discharge boom into the main part of the frame or body. This provides additional structural rigidity and integrity, eliminates weight and complexity of hinges and hydraulic devices, provides additional cubic volume—all of which contribute to increased payload capacity. A low seam variant of the shuttle car may incorporate an elevating discharge conveyor in order to be able to cope with undulations and still discharge above the receiving hopper.

Figure 7:
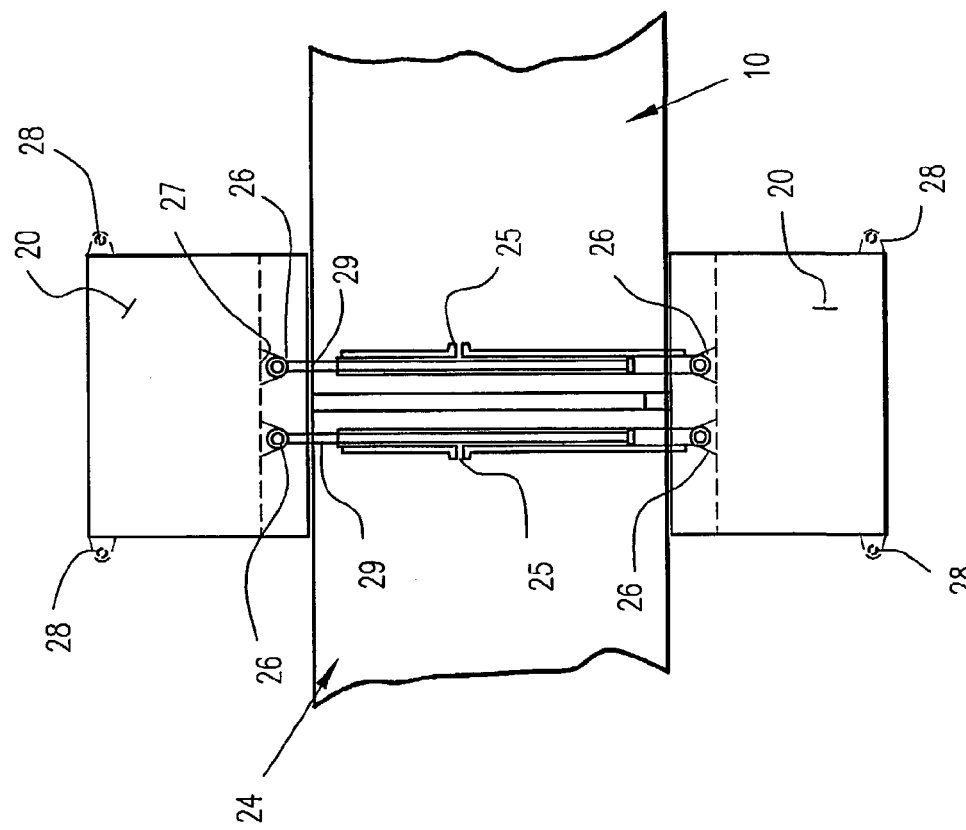
FIG. 7 is a detail schematic view of the powered assist of FIG. 6.
Figure 6:
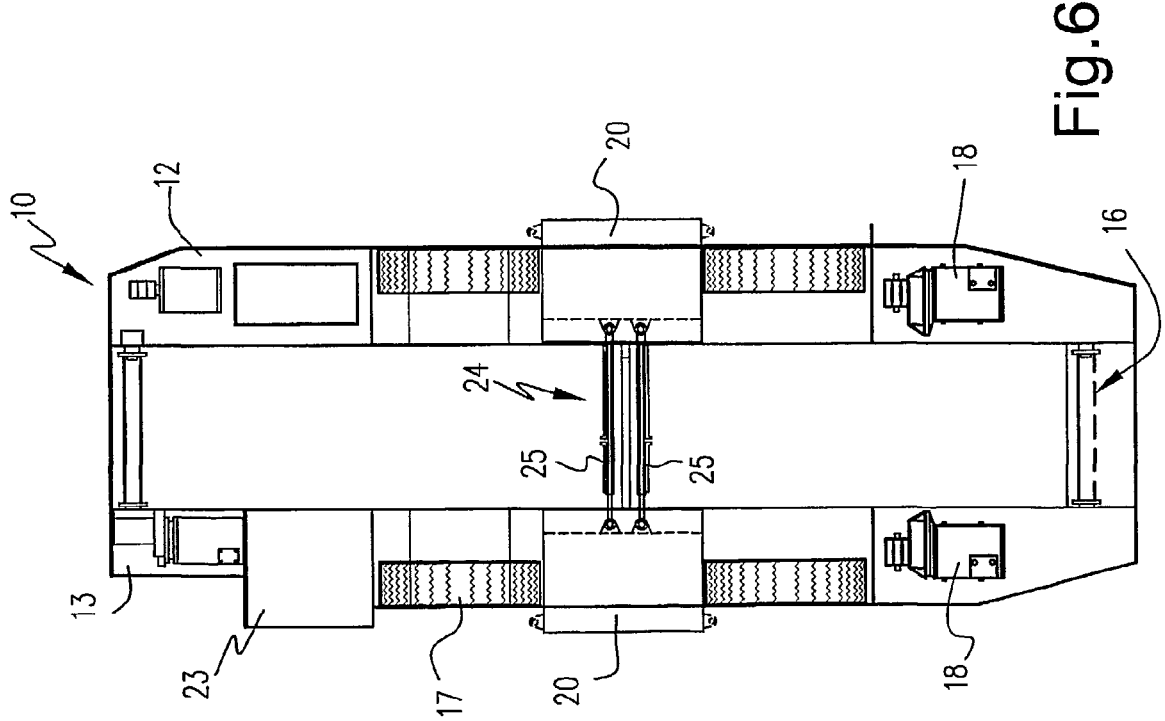
FIG. 6 is a top schematic view of the powered assist for removal and replacement of the batteries utilized with the shuttle car of FIGS. 1 and 2.
Figure 8:
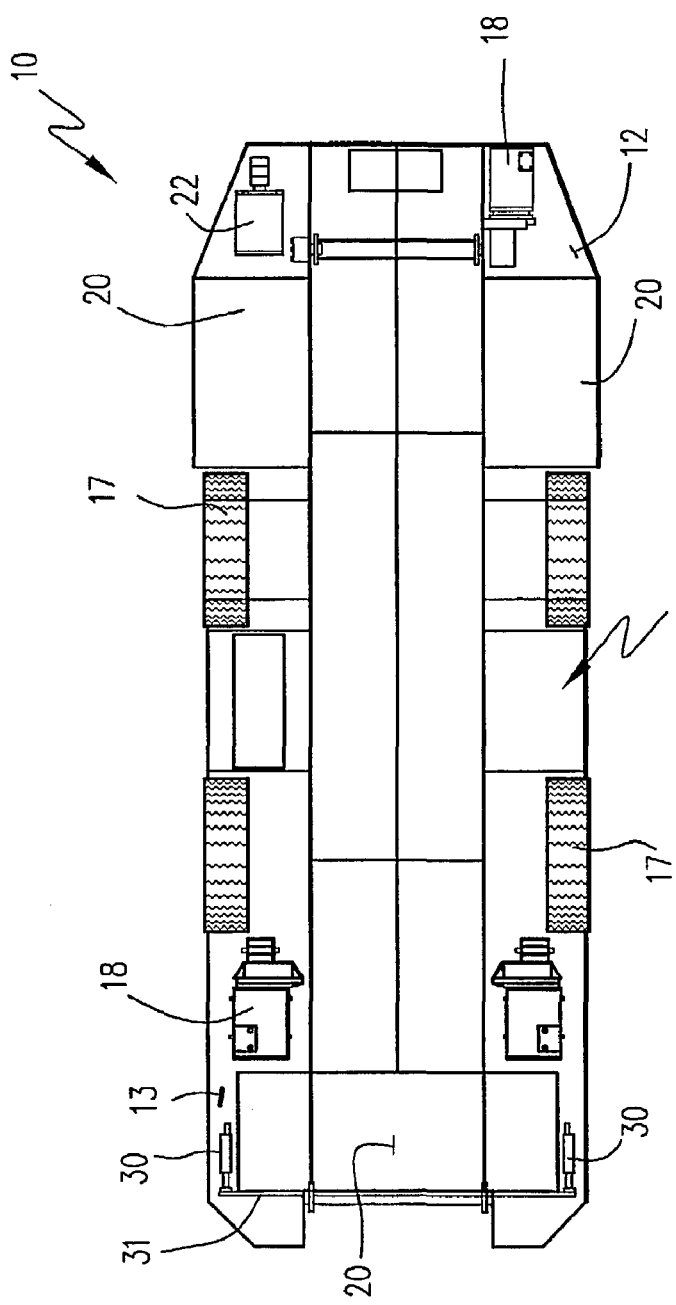
FIG. 8 is a view like that of FIG. 1 of a second embodiment of the shuttle car according to the invention.
Figure 9:
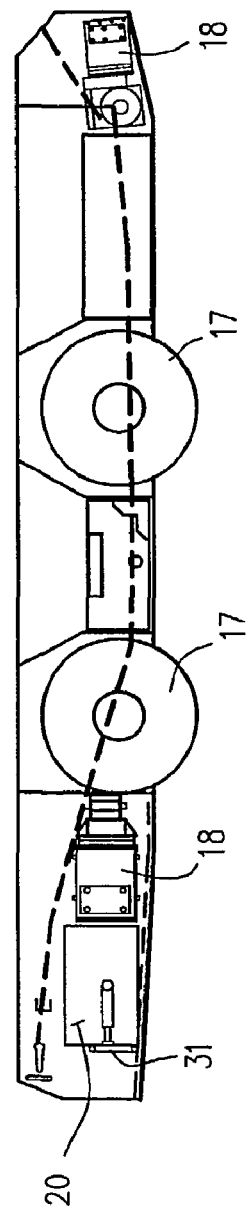
FIG. 9 is a view like that of FIG. 2 of the shuttle car of FIG. 8.
Figure 10:
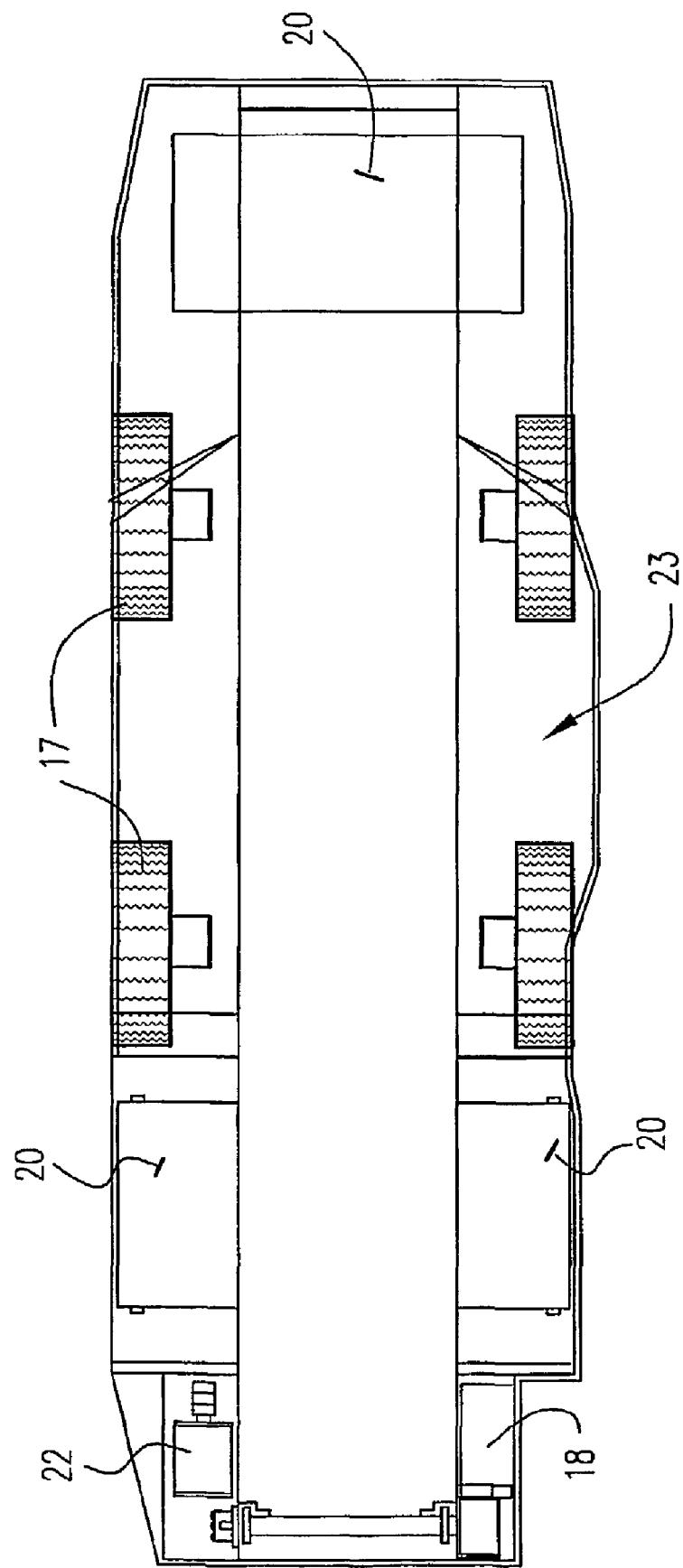
FIGS. 10-12 are top plan views of three further embodiments of shuttle cars according to the present invention illustrating the placement of batteries with respect to the tires and motors therein.
Figure 11:
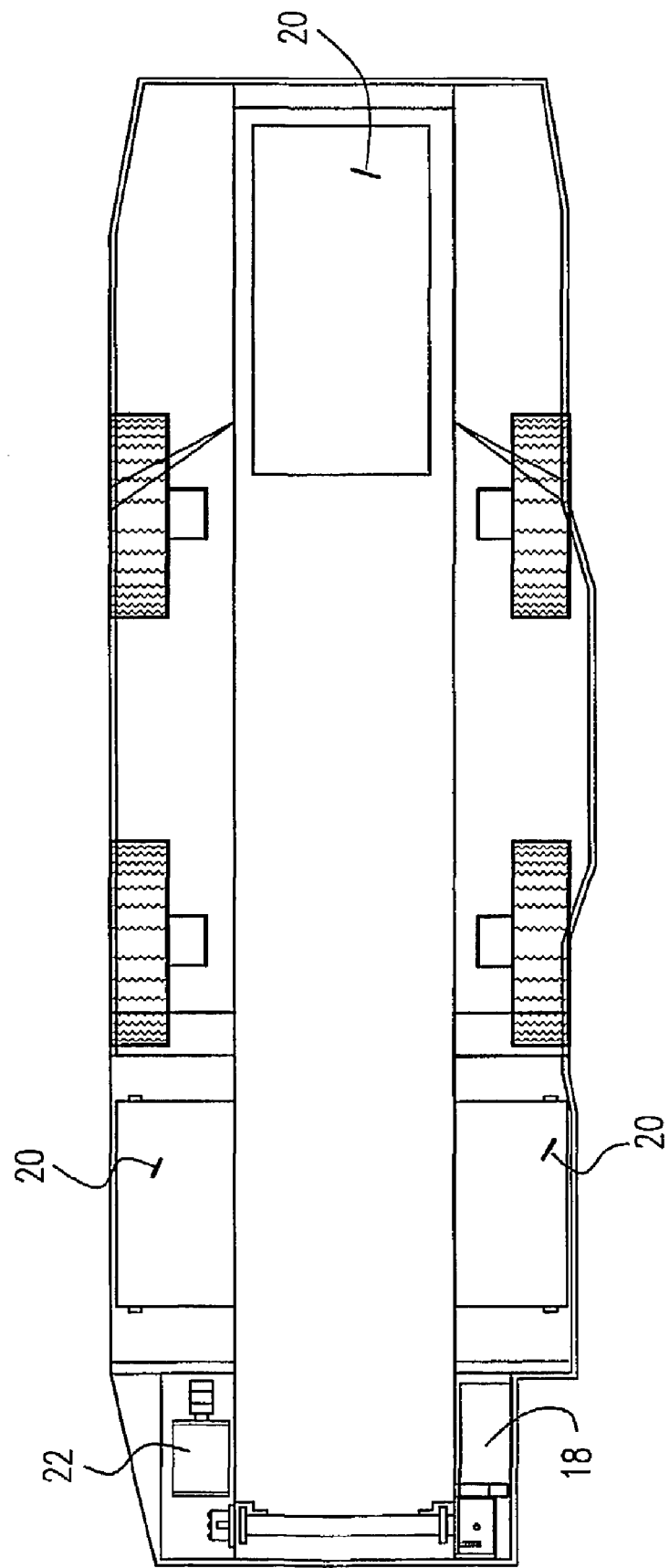
Figure 12:
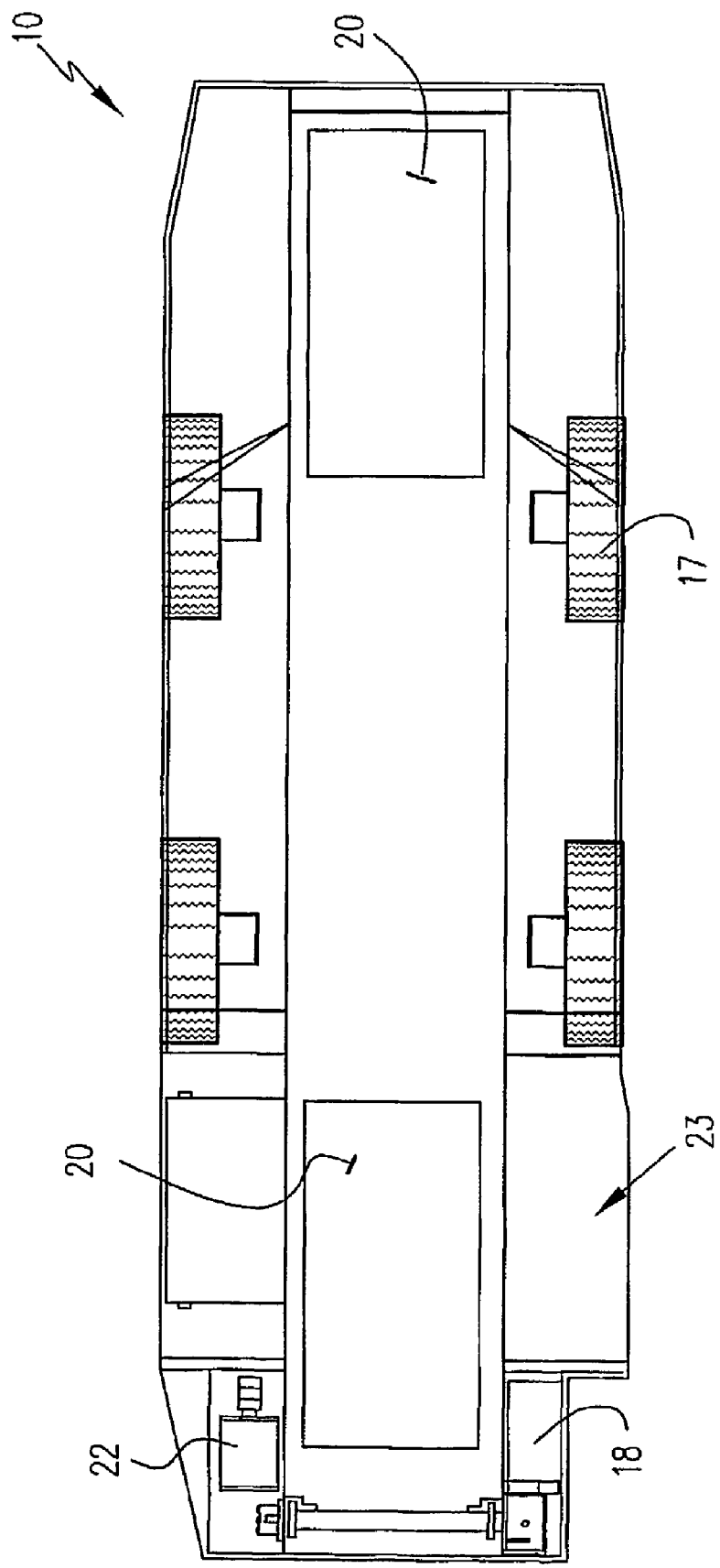

FIGS. 6 and 7 schematically illustrate a particular battery changing mechanism that may be utilized for easily changing the batteries 20 (that is, replacing a substantially discharged battery with a charged battery 20). Many variations and devices can be implemented for the battery changing mechanism including chains, hooks, scissors mechanisms or the like. In a preferred embodiment illustrated in FIGS. 6 and 7, a pair of floating hydraulic cylinders 25 are operatively connected to the batteries 20 or their mountings as mentioned above (typically only during the change over operation) by any suitable conventional quick release connection. A preferred connection is drop-in pins 26 which pass through aligned openings in portions of the floating hydraulic cylinders 25, and in flanges 27 mounted to the batteries 20. Other drop-in pins or any other conventional quick release connection 28 are provided to normally hold the batteries 20 to one of the side portions 12, 13 of the frame 11.

In operation of the battery change-over system 24 illustrated in FIGS. 6 and 7, the floating hydraulic cylinders 25 are connected up to the batteries 20 by using drop-in pins 26 which connect the cylinders 25 to the flanges 27 mounted to the battery casings of the batteries 20. The pins 28 for one battery (e.g. the lower battery 20 in FIG. 7) are in place while the pins 28 associated with the other battery 20 (the upper battery in FIG. 7) are removed. Then the cylinders 25 are actuated by any suitable conventional actuator such as a hydraulic fluid pump, so that the piston rods 29 thereof move outwardly, moving the battery 20 at the top in FIG. 7 off the side portion (12) of the shuttle car 10 and onto any suitable mechanism whether stationary or mobile. Then, the pins 26 associated with the upper battery that has been moved off the shuttle car 10 are removed, a new or recharged battery 20 is put in its place, the pins 26 are reinserted between the flanges 27 and aligned openings in the piston rods 29, and the cylinders 25 are operated so that the rods 29 are pulled back into the cylinders, pulling the new, charged, battery 20 onto the frame side portion 13. Once the battery 20 is properly positioned on the frame side portion 13, the drop-in pins 28 are inserted so that the battery 20 is locked in place. Then, the pins 28 associated with the bottom battery in FIG. 7 are removed, and the procedure is repeated.

FIGS. 8-12 illustrate a number of alternative configurations for the placement of the batteries, operator compartment, motors, and the like, in the shuttle car. In FIGS. 8-12, the same reference numerals are used to illustrate the same components as in the FIGS. 1 and 2 embodiments. Note that in the FIGS. 8 and 9 embodiment, hydraulic or pneumatic cylinders 30 may be provided for moving a clamping plate 31 that holds the transverse battery 20 in place. Note also that the FIG. 10 embodiment is basically the same as the FIGS. 8 and 9 embodiment except for details of the frame.

In all of the embodiments, the drive connection between the motors 18 and the tires 17 (e.g. the axles associated therewith) may comprise any conventional drive components such as gears, sprockets and chains, or other suitable conventional configuration. Also, the same motor 22 that powers the conveyor may perform double duty and also power one of the tires 17 or a hydraulic pump, in which case two different connections would be taken off the driven shaft of the motor 22.

FIG. 13 schematically illustrates the interconnection between conventional components for powering the conveyor 16 that is conventionally used in the shuttle car 10. It should be noted that any conventional conveyor may be utilized for the conveyor 16, FIG. 13 schematically illustrating just one embodiment.

In the embodiment of FIG. 13, the motor 22 through the gear reducer 33 drives a splined shaft 34 which is fitted with external sprockets 35. The drive sprockets 35, when the shaft 34 is rotated, drive the chains 36, which ride over idler sprockets 37 in addition to the drive sprockets 35. The chains 36 are connected to conventional conveyor flights 38 which move with the chains 36 to move the material over a substantially flat conveyor bed between the side portions 12, 13 of the shuttle car 10. A dual chain conveyor may also be provided.

Another alternative for battery change-over is to provide a hinged elevating discharge end or other appropriate mechanism of the shuttle car 10. Hydraulic cylinders or other type actuating mechanisms may be used to effect pivotal movement of the end to lower one or more batteries 20 for replacement, or raise for attachment to the car's electrical components.

Figure 14:
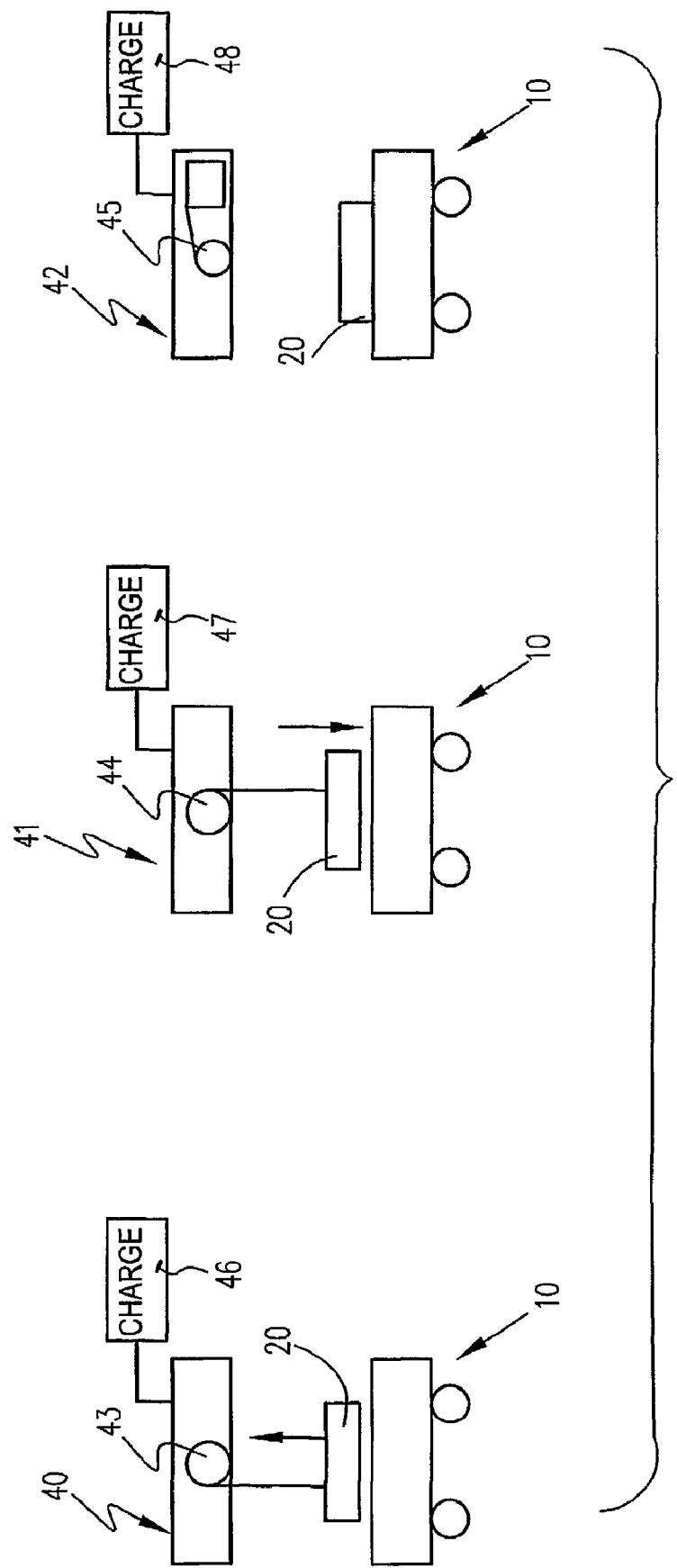
FIG. 14 is a schematic side view showing an overhead battery replacement system according to the invention.

FIG. 14 schematically illustrates still another battery change-over mechanism (aside from that illustrated in FIGS. 6 and 7) that may be utilized according to the present invention. The system illustrated in FIG. 14 is a "roof based" system, utilizing one or more, preferably three, roof mounted monorails 40, 41, and 42 which extend from a battery charging area that in a mining application may be in an existing cross cut of the mine. Each of the monorails 40-42 has a hoist 43, 44, 45, or a like lifting mechanism, associated therewith, and may have a charge cable or charger 46, 47, 48 for charging batteries associated with the units 40-42.

In operation of the roof based system of FIG. 14, a shuttle car 10 with substantially discharged batteries 20 moves underneath the monorail 40. The battery 20 is appropriately disconnected from the motor controller 21. The hoist 43 then is operatively connected, using any conventional components, to the batteries 20 associated with the shuttle car 10, and the hoist 43 lifts the batteries 20 off the shuttle car 10 as illustrated schematically by the upward arrow in FIG. 14. The batteries 20 are moved up into a position which will clear any subsequent shuttle cars, and then are operatively connected to the charge cable or charger 46 to charge the batteries 20 while associated with the unit 40. The shuttle car 10 then moves on to the next unit 41, where charged batteries 20 are lowered by the hoist 44 onto the shuttle car 10 and mounted in place and appropriately hooked up to the motor controller 21. The shuttle car 10 with charged batteries 20 associated therewith (as seen in the right hand portion of FIG. 14 is then ready to be used again. The third unit 42 is used to provide three shift operation. That is, one set of batteries 20 is operating, one set is charging, and the other set is cooling.

Instead of charging, utilizing the chargers 46-48, directly on the units 40-42, the batteries 20 can be moved to a special charging station and placed on charge until next needed to be associated with a shuttle car 10.

FIGS. 15-20 illustrate a battery change-out vehicle that may be used in place of a forklift, or in addition to, the battery changing system of FIGS. 6 and 7, and/or in place of, or in addition to, the system illustrated in FIG. 14.

FIGS. 15 and 16 show the bare chassis 50 of the battery change-out vehicle 51, which includes slotted side boards 52 adapted to receive cross bars 53, and at least four tires 54 which are preferably driven two each by hydraulic motors 55 using sprockets 56, 57, and 58, and sprocket chains 59, 60. Jacks 61 are also preferably provided to position, hold in place, and/or elevate, the vehicle 51 for no movement during the battery change over operation, and after the change over, the jacks 61 are withdrawn so that the vehicle 51 can be powered by the motors 55.

FIGS. 17 and 18 illustrate the vehicle 51 of FIGS. 15 and 16 with a roller bed 63 which can alternatively be power driven placed on the chassis 50 for receipt of batteries thereon, and showing a hydraulic pump motor 65 operatively connected to a tank 66 of hydraulic fluid for powering the motors 55 (FIG. 15). In FIGS. 17 and 18, the leveling jacks 61 are also in the "up" position allowing the vehicle 51 to be moved along the floor by the pump 65 powering the motors 55 to thereby in turn rotate the wheels 54.

FIGS. 19 and 20 are the same as FIGS. 17 and 18 only they show batteries 20 that have been moved onto the roller bed 63 for transport to or from a charging area. For example, one battery 20 can be moved by the battery change mechanism of FIGS. 6 and 7 onto one end of the roller bed 63, and then the vehicle 51 can be turned around, and a charged battery 20 at the opposite end of the vehicle 51 can be hooked up to the cylinders 25 and moved back onto the shuttle car 10 of FIGS. 6 and 7. The batteries 20 may be relatively easily manually moved along the roller bed 63. Any other suitable powered mechanism, or manpower, may be provided for moving the batteries 20 onto and off the battery changer car 51.

Figures 21, 22:
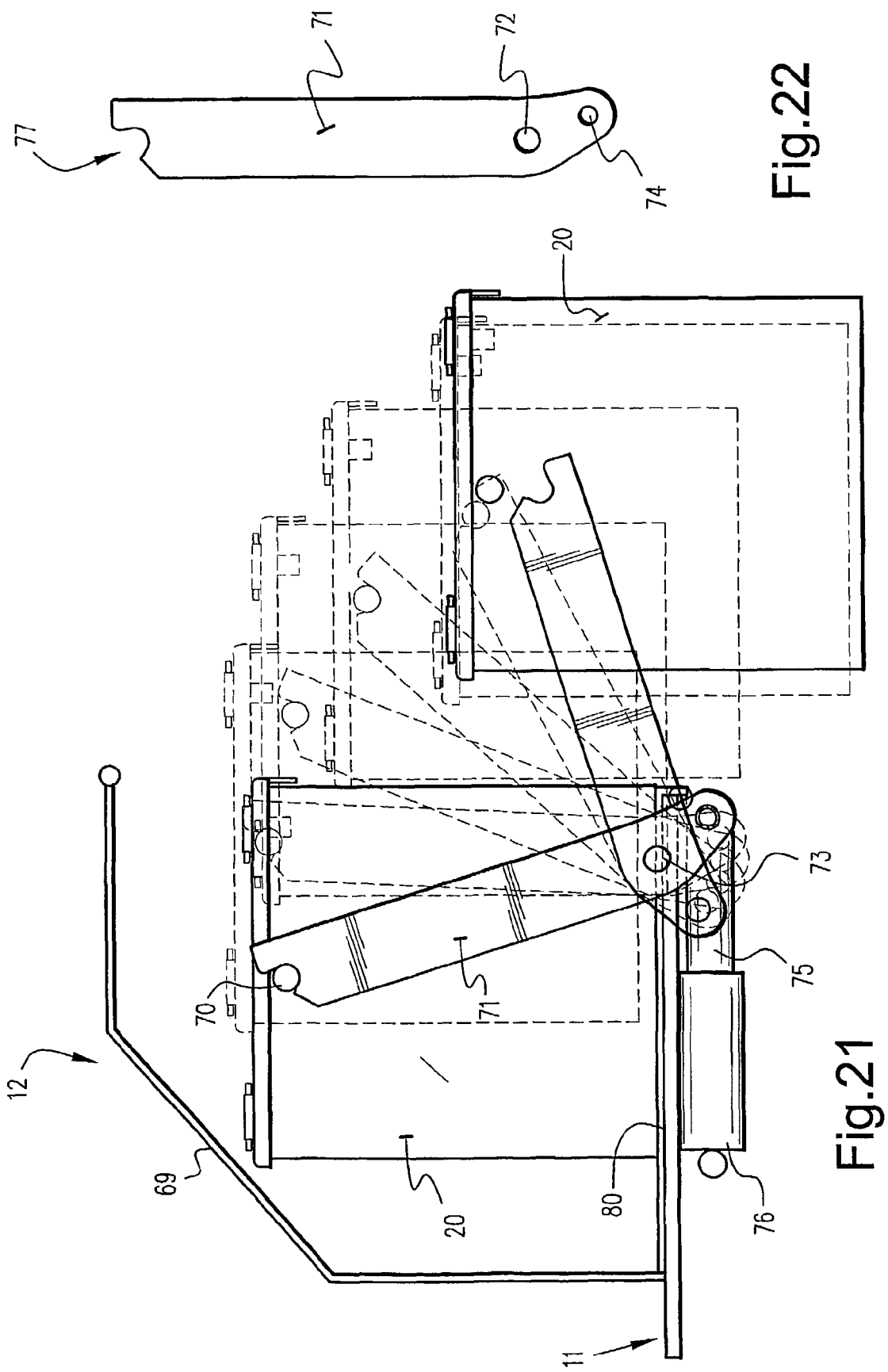
FIG. 21 is a schematic side view showing another embodiment of a battery change assisting mechanism that is particularly suitable for use with "side saddle" mounting of the batteries, such as illustrated in FIGS. 1 and 2 of the drawings.
FIG. 22 is a side view of one of the arms used with the battery change mechanism of FIG. 21.

The battery change assist mechanism of FIGS. 21 and 22 is most suitable for "side saddle" mount of batteries 20 according to the invention, as in the shuttle car 10 of FIGS. 1 and 2. In the embodiment of FIG. 21, a shroud 69 associated with the side portion 12 (a similar shroud being associated with the side portion 13) of the vehicle 10 contains the battery 20 therein. The battery 20 has a pair of symmetrical pins or suitable lifting eyes 70 (only one being shown in FIG. 21, and another being provided on the opposite side of the battery casing) extending outwardly from the battery 20 casing, substantially parallel to the dimension 19 (see FIG. 1). Mounted in association with the pins 70 are a pair of lever arms 71, one of which is shown in FIGS. 21 and 22. As seen most clearly in FIG. 22, the lever arm 71 has an opening 72 for receipt of a pivot pin 73 (see FIG. 21) for mounting the lever arm 71 for pivotal movement about a substantially horizontal axis substantially parallel to pins 70, and has an opening 74 adjacent the bottom thereof for connection to an actuator, such as the piston rod 75 of a linear actuator (e.g. hydraulic or pneumatic cylinder) 76 or other powered assist device. At the top end of the lever arm 71, opposite the opening 74, is a notch 77 which is dimensioned to receive and locate a pin 70 therein.

The piston rod 75 can be connected to both of the lever arms 70 by connecting the piston rod 75 to a cross-member (not shown) which engages both of the openings 74 in the lever arms 71 associated with the battery 20 illustrated in FIG. 21, or a separate piston rod 75 and cylinder 76 may be associated with each of the lever arms 71, and a separate pin from each piston rod 75 connected to an opening 74 in its corresponding lever arm 71.

Operation of the battery change mechanism of FIGS. 21 and 22 is seen clearly in FIG. 21, the battery moving from the left side solid line configuration, through the dotted line positions illustrated in FIG. 21, to the right solid line position by the cylinder 76 retracting the piston rod 75. In the left solid line position, the battery 20 is supported on a component 80 of the frame 11 of the shuttle car 10, and in the right solid line position in FIG. 21, the battery 20 is supported by the ground, floor, vehicle or other appropriate structure so that the lever arm 71 is detached therefrom. In the rightmost position illustrated in FIG. 21, the discharged battery 20 can be lifted (manually or by some powered mechanism, such as a forklift or overhead crane) and a charged battery 20 moved in its place. Then, the cylinder 76 extends the piston rod 75 so that the battery 20 is moved from the rightmost position in FIG. 21 to the leftmost position, after which the battery terminals are connected up to the appropriate cables associated with the shuttle car 10, as described above. The pins 70 may be used by a forklift, or with an adapter associated with forklift blades, to facilitate movement of the battery 20, or the battery 20 may be lowered onto a pallet instead of actually lowered onto the floor, and the forklift can lift the pallet. For the embodiment illustrated in FIGS. 21 and 22, the battery can easily be moved a vertical distance of about fourteen inches, using a lever arm 71 having a length from pivot 72 to the notch 77 of about thirty inches. The total length of travel of the piston rod 75 need only be about seven to eight inches.

While FIGS. 21 and 22 illustrate one exemplary embodiment using a lever facilitating change of batteries, it is to be understood that a wide variety of other modifications may be utilized. For example, a linear actuator or actuators may be positioned at different points, and a plurality of different levers or linkages may be utilized. Also, other attachments of a lever to the battery 20 other than notches 77 as illustrated in FIG. 22 may be utilized. A wide variety of configurations of the notch 77, or alternatives to notch 77, may be provided including, but not limited, a link or a series of links (e.g., chain) that have a loose fit on the arm and could be manually placed on and removed from the pin 70 as desired; a loose collar; lifting eyes; or a wide variety of other conventional structures or attachments.

The shuttle car 10 according to the invention may also be provided with a "full load" indicator, shown schematically at 83 in FIGS. 4 and 5. An operator positioned in the operator cab or compartment 23 often has a difficult time in safely viewing when the coal or other material, which is transported in the direction of the arrow 84 in FIG. 4 from the receiving end 80 to the discharge end 81, has reached the end of conveyor 16 (i.e. when the conveyor/car is full, but is not overrun). It is clearly advantageous to transport a full, but not overloaded, shuttle car 10 between the receiving and ultimate discharge locations in order to optimize the material transport process and maximize the amount of material transported for a given charge of the batteries 20. To facilitate that purpose, the "full load" indicator 83 is utilized. While the full load indicator 83 is illustrated positioned adjacent the end 81 on the operator cab 23 side frame portion 13 of the shuttle car 10 in FIG. 4, depending upon the construction of the side portion 12, 13 of the shuttle car 10 it may be desirable to locate the full load indicator at the side portion 13, or at other locations.

A particular desired embodiment of a full load indicator 83 is illustrated in FIGS. 23-25. It should be understood, however, that this is only one embodiment, that instead of the simple mechanical structure illustrated in FIGS. 23-25, a more complex mechanical arrangement may be provided, with an indicator remote from the actual sensing (so that the indicator may be more easily seen by the operator in the cab 23), or a sophisticated proximity sensor (such as an optical sensor) or the like having a remote indicator light or other indicator may be utilized.

In the simple and advantageous mechanical configuration of the full load indicator 83 in FIGS. 23-25, a material-engaging sensing arm 85 is provided mounted by a bushing 86 in a substantially vertical wall 87 defining one side of the conveyor 16. The bushing 86 may be connected to the wall 87 by a weld shown schematically at 88 in FIG. 23 where the bushing 86 passes through an opening in the wall 87. A pivot rod 89 extends through the bushing and is either releasably or permanently connected (e.g. by screws, a weld, or the like) to the sensing arm 85 at one end thereof, and to an indicator, such as a flag 90, at the other end thereof.

As shown by the side view of FIG. 24, when coal or other material moving in the direction 84 contacts the sensing arm 85, it causes the arm 85 to pivot about the axis defined by the rod 89 in the bushing 86, as indicated by the arrow 91 in FIG. 24. This causes the flag 90 to move to a substantially upright position as indicated schematically in dotted line in FIG. 24. When the operator in the cab 23 sees the flag 90 moving toward or at the upright position, dotted line in FIG. 24, the operator immediately stops operation of the conveyor 16 (e.g. by de-energizing the motor 22) since the shuttle car 10 is then known to be "full". Alternatively, automatic deactivation could be provided.

In the embodiment illustrated in FIGS. 23-25, the flag 90—which may be brightly colored, luminescent, or even have a battery powered light thereon—is shown spaced from the rod 89 by an integral support arm 92, but it is to be understood that the flag 90 may be mounted directly on the arm 89, or there may be other configurations, and other indicators besides a flag may be used. Also, while the arm 85 is shown with a particular shape in the drawings, it is to be understood that other shapes may be provided depending upon the particular configuration of the conveyor 16, or the like.

Figure 28:
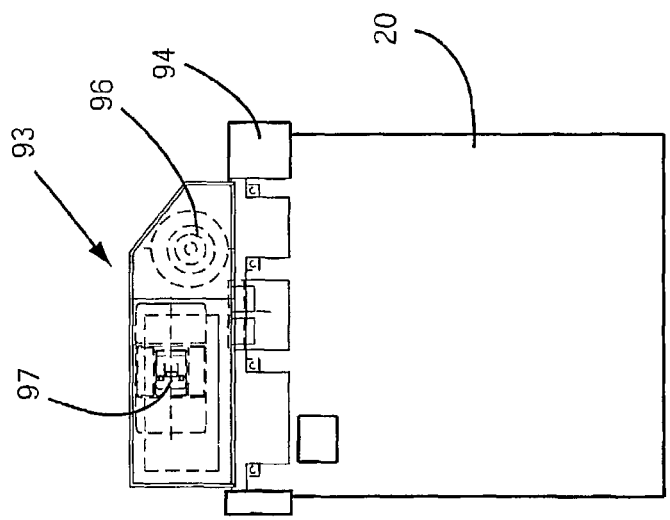
FIGS. 26-28 are side, top, and front views, respectively, of an exemplary battery with circuit breaker that is preferably utilized with shuttle cars according to the invention.
Figure 27:
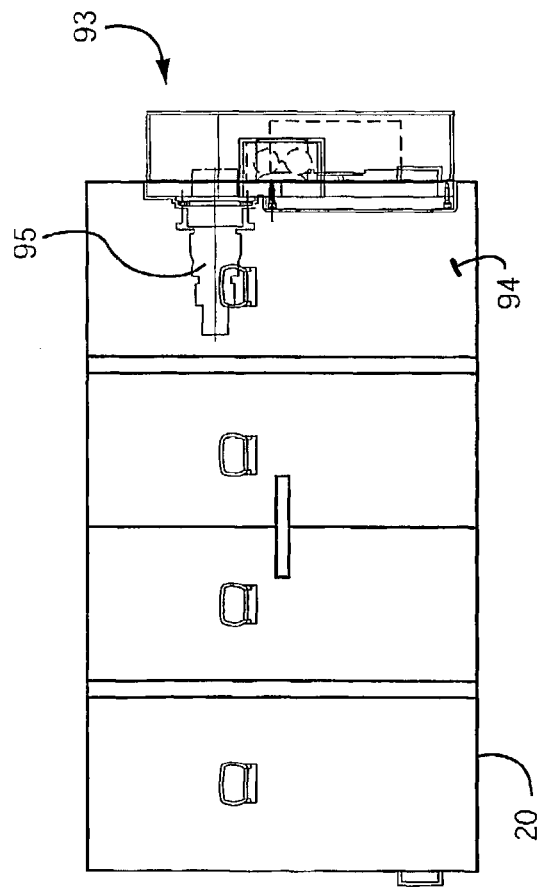
Figure 26:
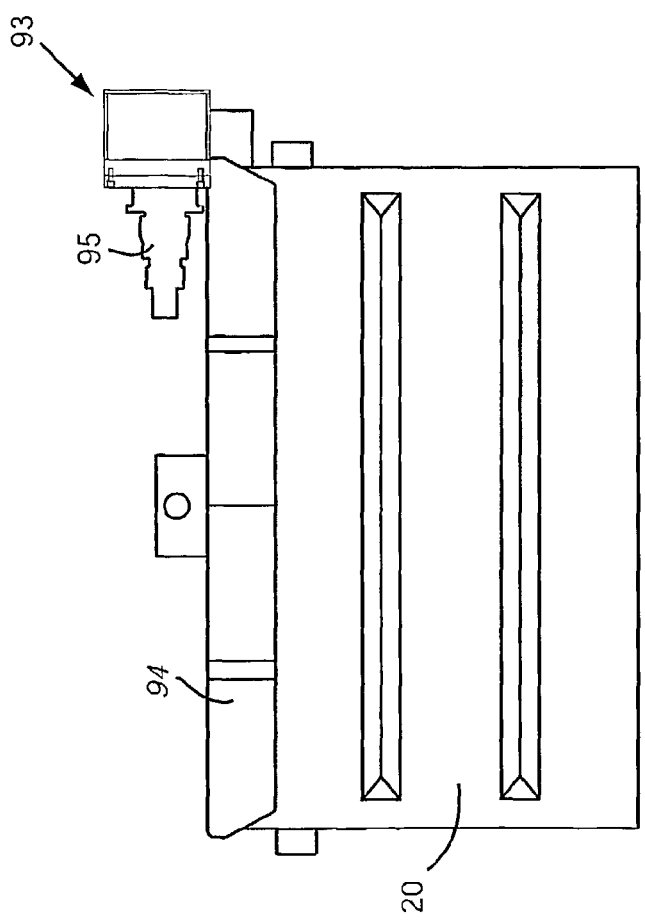

In order to ensure safe operation of the shuttle car 10, it is desirable to be able to completely disconnect the batteries 20 when the shuttle car 10 is not in use. This may be accomplished by utilizing a circuit breaker assembly shown at 93 in FIGS. 26-28, mounted on a battery lid 94 covering the battery 20. The circuit breaker 93 has an electrical connection 95 for connection to a cable which leads to other batteries 20 and/or a solid state IGBT and/or SCR controller, and the circuit breaker 93 is electrically connected to the terminals of the battery 20. Also, a built in plug 96 may be provided which can be used to connect the circuit breaker 93 to another battery 20 or other electrical component. The circuit breaker 93 may be of conventional construction, and have an operating lever 97 (see FIG. 28) extending outwardly which operates a simple single pole throw switch inside the breaker 93 housing which when "off" shuts off all electrical power from or to battery 20, but when "on" connects the battery 20 to the other electrical components of the shuttle car 10 so that the shuttle car 10 is operable. Alternatively, the circuit breaker 93 may be mounted elsewhere on the frame of the shuttle car 10 and connected by a cable from the circuit breaker 93 to an appropriate plug mounted on the battery.

Additionally, or alternatively, instead of providing the manual switch actuator 97, the circuit breaker 93 can be condition responsive, such as to a current surge, fire (heat), or other external condition.

The utilization of the circuit breaker 93 will facilitate approval and certification from the U.S. Mine Safety and Health Administration (MSHA) for shuttle cars used in the United States. In addition to the circuit breaker 93 providing an important safety feature by de-energizing the battery 20, the circuit breaker 93 also is preferably explosion proof, pursuant to testing and certification by MSHA, and will be assigned an explosion proof (XP) number unique to the particular circuit breaker 93 when such certification is required for mining applications.

It may also be desirable when connecting the batteries 20 in series to ultimately connect them inside a main controller prior to connection to the SCR and/or IGBT solid state electronic traction control device. This helps ensure that the electronic devices control the design voltage levels in a proper manner.

The shuttle car 10 may also utilize a hydraulic circuit that conserves battery power consumption or current draw. For example, the hydraulic circuit could utilize an accumulator for a hydraulic system that provides hydraulic flow and pressure during the demand for hydraulic energy such as steering or braking the shuttle car 10. The hydraulic pump, controlled by a solid state starter, would then only cycle on and off as a recharging device for a hydraulic accumulator.

The shuttle car 10 may also have a unique safety circuit that, when engaged, prevents the wheels from turning, engaging the parking brake automatically and disengaging the hydraulic steering circuit completely. At the same time, the safety circuit would enable the hydraulic battery change out circuitry to function (as described above). Therefore, the shuttle car 10 would be effectively precluded from unintended movements and resulting hazards.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A battery powered shuttle car comprising:
a vehicle frame supporting a plurality of wheels including at least a left front wheel, a left rear wheel, a right front wheel, and a right rear wheel;
at least one motor coupled with the vehicle frame and the plurality of wheels; and
three batteries connected in series and operatively coupled with the motor, the batteries powering the motor, one of the batteries being disposed between the left front wheel and the left rear wheel, another of the batteries being disposed between the right front wheel and the right rear wheel, and a last of the batteries being disposed in a central portion of the shuttle car.

2. A battery powered shuttle car comprising:
a vehicle frame supporting a plurality of wheels including at least a left front wheel, a left rear wheel, a right front wheel, and a right rear wheel;
at least one motor coupled with the vehicle frame and the plurality of wheels; and
three batteries connected in series and operatively coupled with the motor, the batteries powering the motor, one of the batteries being disposed in substantial alignment with the left front wheel and the left rear wheel, another of the batteries being disposed is substantial alignment with the right front wheel and the right rear wheel, and a last of the batteries being disposed in a central portion of the shuttle car.

3. A method of changing a battery mounted on a battery powered shuttle car, wherein a first battery is mounted in alignment with a left front wheel and a left rear wheel, and a second battery is mounted in alignment with a right front wheel and a right rear wheel, the method comprising:
  securing at least one actuating mechanism between the first and second batteries;
  releasing one of the first and second batteries from the vehicle frame;
  driving the actuating mechanism against the other of the first and second batteries to thereby move the one of the first and second batteries off of the vehicle frame; and
  receiving one of the first and second batteries on an adjacent mechanism.

* * * * *